(12) United States Patent
Miglianico et al.

(10) Patent No.: US 8,172,028 B2
(45) Date of Patent: May 8, 2012

(54) VEHICLE DRIVING CONTROL

(75) Inventors: Denis Miglianico, Tassin La Demi Lune (FR); Jean-Michel Delemotte, La Rochelle (FR)

(73) Assignee: Alstrom Transport SA, Levallois-Perret (FR)

( * ) Notice: Subject to any disclaimer, the term of this patent is extended or adjusted under 35 U.S.C. 154(b) by 321 days.

(21) Appl. No.: 12/507,975

(22) Filed: Jul. 23, 2009

(65) Prior Publication Data

US 2010/0018794 A1    Jan. 28, 2010

(30) Foreign Application Priority Data

Jul. 25, 2008 (FR) ..................................... 08 55137

(51) Int. Cl.
*B60K 26/00* (2006.01)
(52) U.S. Cl. ..... 180/315; 180/318; 180/333; 74/479.01; 74/491
(58) Field of Classification Search .................. 180/315, 180/318, 333; 74/471 R, 479.01, 488, 491
See application file for complete search history.

(56) References Cited

U.S. PATENT DOCUMENTS

| | | | |
|---|---|---|---|
| 5,389,752 A | 2/1995 | Karbassi | |
| 6,694,590 B1 * | 2/2004 | Jenkins | 29/423 |
| 6,948,582 B2 * | 9/2005 | Shiomi et al. | 180/315 |
| 7,137,475 B2 * | 11/2006 | Shiomi et al. | 180/315 |
| 7,195,095 B2 * | 3/2007 | Oana | 180/315 |
| 7,740,101 B2 * | 6/2010 | Yanaka | 180/315 |
| 7,748,645 B2 * | 7/2010 | Breese | 239/172 |

FOREIGN PATENT DOCUMENTS

| | | |
|---|---|---|
| DE | 10 2006 034 125 B3 | 2/2008 |
| EP | 1 400 426 | 3/2004 |
| EP | 1 690 820 A1 | 8/2006 |
| EP | 1 811 534 | 7/2007 |

OTHER PUBLICATIONS

Search Report of French Priority Application FR 08 55137 (2 pages) and brief translation thereof (1 page).

* cited by examiner

*Primary Examiner* — Toan To
(74) *Attorney, Agent, or Firm* — Davidson, Davidson & Kappel, LLC

(57) ABSTRACT

A vehicle driving control is provided. The vehicle driving control includes a dead man's system (VACMA) processing device and a lever arm capable of moving in a predetermined actuation direction with a handle. The handle is arranged at one end of the arm and includes an upper face, at least one lateral face, and a touch button which is electrically connected to the processing device. The touch button is located in the region of the lateral face.

10 Claims, 4 Drawing Sheets

VEHICLE DRIVING CONTROL

Priority is claimed to French Application No. 08 55137 filed on Jul. 25, 2008, the entire text of which is hereby incorporated by reference herein.

The present invention relates to a driving control for a vehicle, in particular a rail vehicle, and the corresponding method of use, the driving control comprising an integrated dead man's system (in French: "Veille Automatique par Contrôle de Maintien d'Appui" or VACMA) control element.

BACKGROUND OF THE INVENTION

Conventionally, train or tramway driving devices which are installed in control cabins include a VACMA system, by means of which the vigilance of the driver is regularly monitored.

The driver is obliged to hold in the pressed state a control element in the form of a manual button or a pedal for a duration of between 15 and 60 seconds then to release it regularly for a duration typically of from 2 seconds to 5 seconds in order to verify that the driver has not fallen asleep or died and to actuate an emergency stop of the vehicle in the event of a failure of vigilance.

It is known that such an obligation involves constraints of physical and mental fatigue for the driver when driving.

In order to improve the ergonomics linked to driving the vehicle and the actuation of control of the dead man's system, document EP 169 0820 A proposes integrating the control of dead man's system in the traction and braking driving handle in the form of a touch button.

However, the document does not describe a detailed geometric architecture of the assembly comprising the driving handle/dead man's system control touch button which ensures a high-quality level of ergonomics, that is to say, which involves a minimal level of muscular tension/flexion for the driver.

SUMMARY OF THE INVENTION

The technical problem is to determine a geometric architecture of the assembly constituted by the driving handle and the touch button which is ergonomic for a VACMA system.

The present invention provides a vehicle driving control including a dead man's system processing device and a lever arm which is capable of moving in a predetermined actuation direction. A handle is arranged at one end of the arm and has an outer shape which is adapted to the shape of the palm of a hand. The handle includes an upper face which is located opposite the lever arm relative to the handle, at least one lateral face which is generally perpendicular relative to the upper face, and a touch button which is electrically connected to the dead man's system processing device, which is located in the region of the lateral face.

According to specific embodiments, the driving control may include one or more of the following features:

- the touch button is located in the region of a lateral face which is parallel with the actuation plane (P) which contains the actuation direction;
- the handle is symmetrical relative to a plane of symmetry which contains the actuation direction and the distance from the touch button to the plane of symmetry is less than or equal to 25 mm;
- the control includes a support element relative to which the handle can be moved and the handle has a reference position in which the lever arm is arranged so as to be normal relative to the plane of the support element and, in the reference position, the distance from the touch button to the support element is less than or equal to 95 mm;
- the touch button is touch-sensitive;
- the handle includes a generally tubular base which extends along the axis of the arm upon which there is fitted a head which has an ovoid shape and a major axis and which is inclined relative to the base;
- the angle α which is formed by the extension plane of the support element and the major axis of the head is between 5 degrees and 85 degrees;
- the handle is hollow and the touch button is capable of being electrically connected to the inner side of the handle by means of an electric cable;
- the lever arm is hollow in order to provide a passage for an electric cable which is connected to the touch button, the passage being inaccessible from the outer side;
- the processing device includes an electromechanical relay or an electronic element which is capable of detecting a passage of current when the touch button is pressed; and
- the processing device includes an electromechanical relay or an electronic element which is capable of detecting an interruption of current when the touch button is pressed.

The invention also provides a method for manual use of a driving control, the control being capable of occupying a neutral reference position N, of being actuated towards an operator in a rear position, of being actuated in a front position when the control is actuated and moves away from the operator, the method including the steps of touching the touch button with at least the thumb or the index finger of the operator without changing the movement of the wrist when the control occupies the neutral position or the front position, and touching the button with the middle or third finger without changing the position of the wrist when the control is actuated towards the rear position, the operator being in a seated position.

BRIEF DESCRIPTION OF THE DRAWINGS

The invention will be better understood from a reading of the following description of one embodiment, given purely by way of example and with reference to the drawings, in which.

DETAILED DESCRIPTION OF THE PREFERRED EMBODIMENTS

Figure 1:
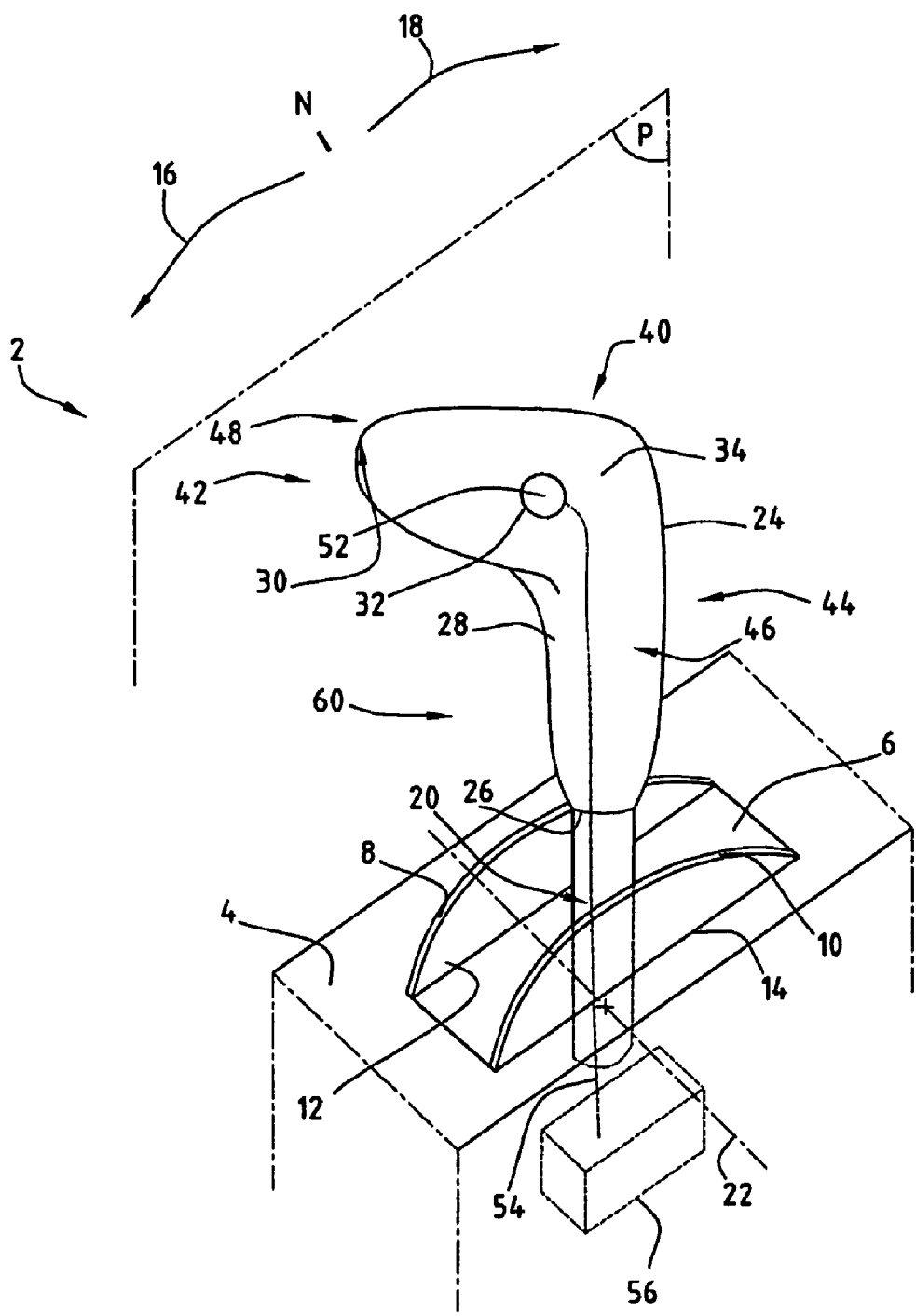
FIG. 1 is a perspective view of a driving control according to the invention.
Figure 2:
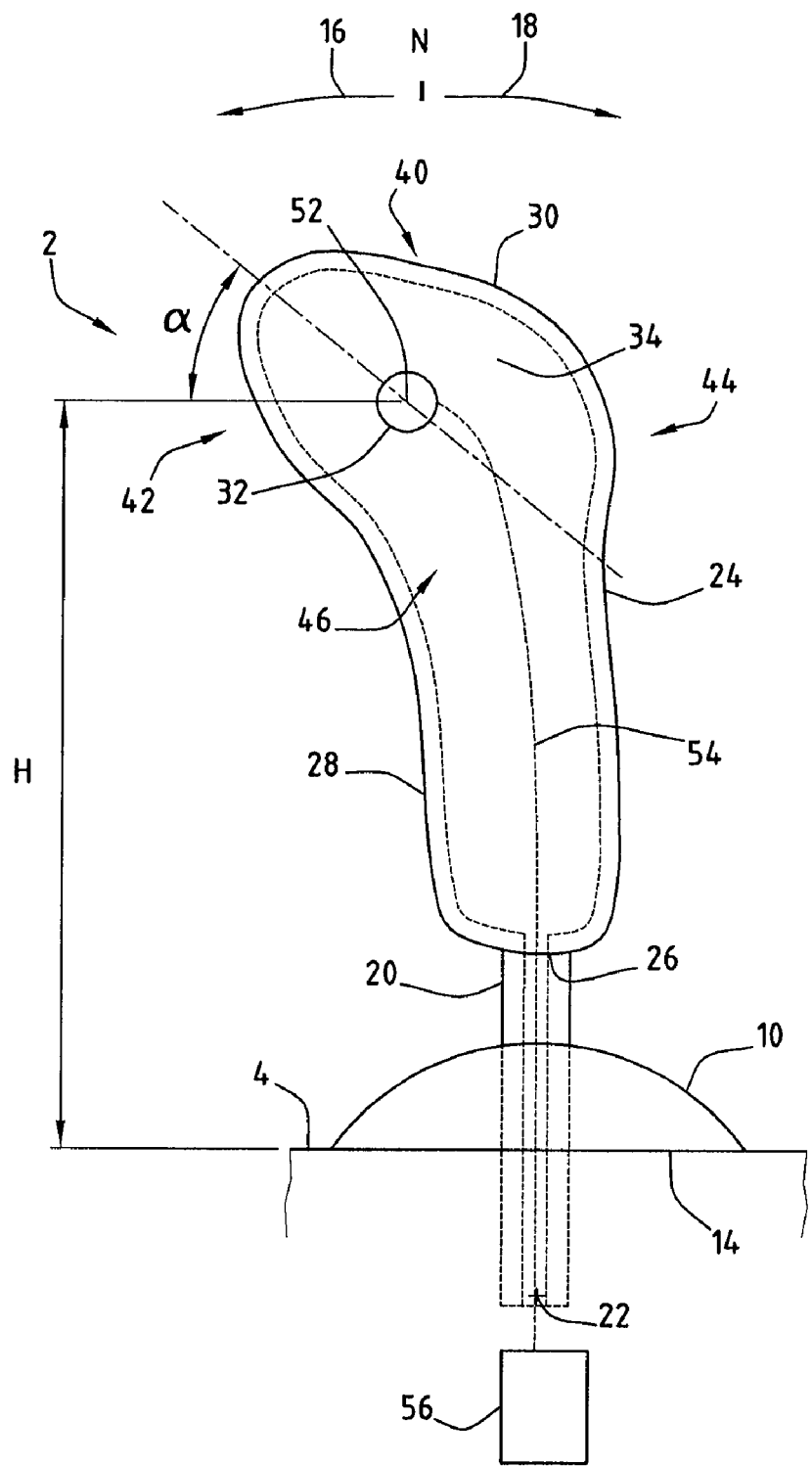
FIG. 2 is a left-hand side view of the driving control of FIG. 1.
Figure 3:
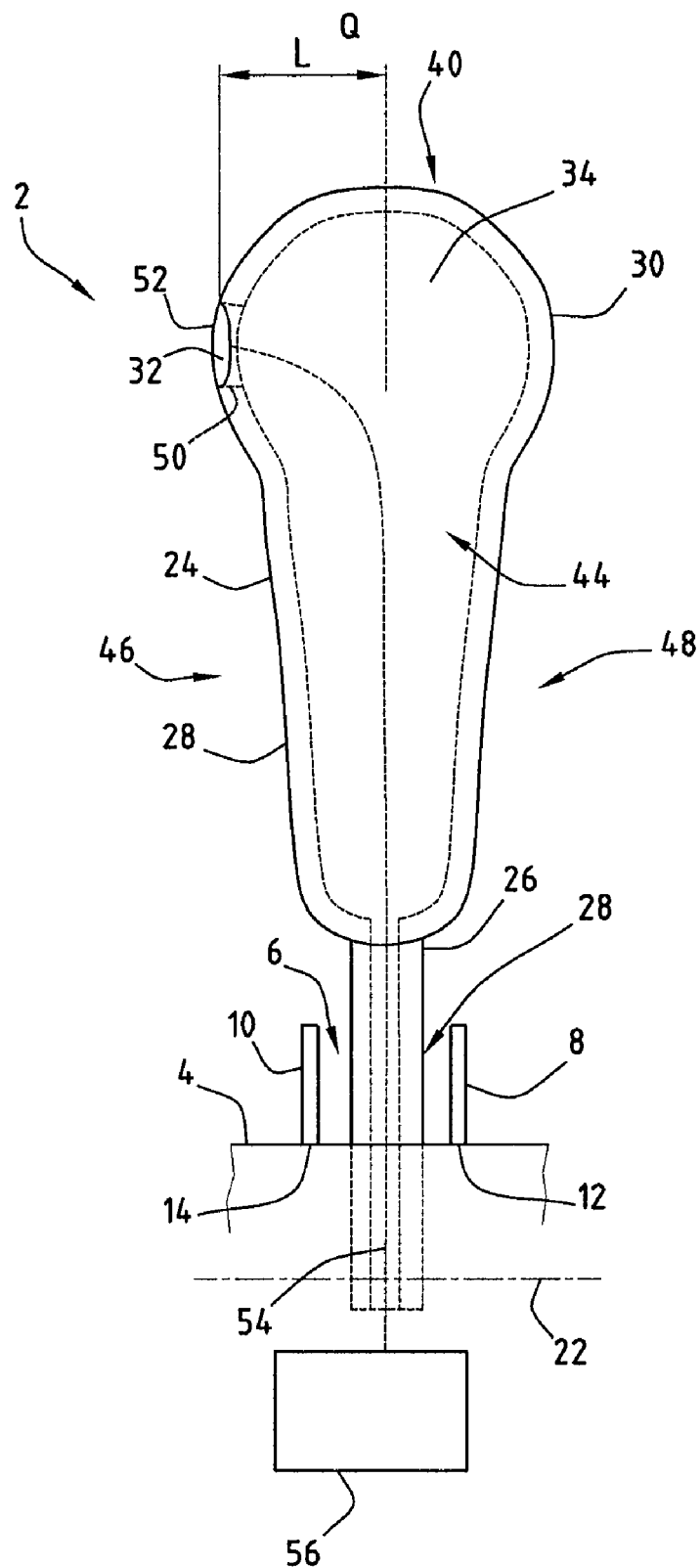
FIG. 3 is a rear view of the driving control of FIG. 1.

A driving control 2 according to FIGS. 1, 2 and 3 is installed so as to be able to move relative to a planar support element 4 of a driver's console which is installed in a control cabin.

The driving control 2 is capable of being moved in accordance with a rotation movement in both directions of small magnitude contained in an extension travel plane P which is defined by a sliding member 6.

The sliding member 6 is delimited by two walls 8, 10 which each form a disc portion. Each wall 8, 10 includes a rectilinear portion 12, 14, respectively, which forms a chord of the associated disc portion and which rests on the support element 4.

A forward and backward movement direction, illustrated by the arrow 16 and the arrow 18, corresponds to an actuation direction of the traction and braking control of the vehicle, respectively, a neutral intermediate position N being defined and corresponding to a lack of driving command.

The drive control 2 includes a lever arm 20 which is capable of pivoting about an axis 22 relative to the support element 4, and a handle 24 which is fitted to one end 26 of the lever arm 20 which is located at the side of the two walls 8, 10 of the sliding member 6.

The handle 24 comprises a generally cylindrical base 28 which extends along the axis of the lever arm 20 and in which the end 26 is fitted. It further includes a head 30 which has an ovoid shape and which is fitted over the base and inclined relative thereto, and a touch button 32 which is touch-sensitive.

The angle α, which is illustrated in FIG. 2, formed by the extension plane of the support element 4 and the major axis of the ovoid head 30 is between 5 degrees and 85 degrees.

The handle 24 includes a solid shell 34 having five faces 40, 42, 44, 46, 48, including an upper face 40 of the head 30, a front lateral face 42 which is orientated in the forward movement direction 16, a rear lateral face 44 which is orientated in the backward movement direction 18, a left-hand lateral face 46 which is located at the left-hand side when facing forwards 16, a right-hand lateral face 48 which is located at the right-hand side when viewed facing forwards 16.

The left-hand and right-hand lateral faces 46, 48 are symmetrical relative to a plane of symmetry Q which is parallel with the movement plane P and which is in alignment therewith in this instance.

The faces 40, 42, 44, 46, 48 are regular surfaces which are connected in a smooth manner by means of fillets.

The upper face 40 of the head is, owing to its shape, capable of being touched in the flat state by the palm of a hand and of being grasped on the portion thereof connected to the front lateral face 42 by the fingers of the same hand, in particular the index finger, the middle finger and the little finger.

The rear face 44, owing to its shape at the head portion 30 which is connected to the upper face 40, is capable of being pushed forwards by the palm of a hand.

The front face 42 is capable, owing to its shape at the head portion 30 thereof which is connected to the upper face 40, of being pulled backwards by the fingers, in particular the index finger, and of being grasped on the base portion 28 thereof by the fingers, in particular the middle finger and the little finger.

The touch button 32 which is touch-sensitive is arranged in a hole 50 (FIG. 3) which is formed in the solid shell 34 which forms the carrying structure of the handle 24 and which is removably fixed to the shell 34.

The touch button 32 includes a fixed tactile surface 52 which is flush in the region of the edge of the hole 50 forming an edge with the left-hand lateral face 46 of the handle 24.

The touch button 32 is preferably located in the region of the left-hand lateral face 46 or the right-hand lateral face 48 of the handle.

The arrangement of the touch button 32 in the region of the left-hand lateral face 46 or in the region of the right-hand lateral face 48 corresponds to the example illustrated in FIG. 1 of a driver station located at the left-hand side of the control which can be actuated by the right hand, or to the example which is not illustrated of a driver station which is located at the right-hand side of the control which can be actuated by the left hand.

In a variant, the touch button 32 is located in the region of the front lateral face 42 or the rear lateral face 44.

As shown in FIG. 3, the touch button 32 is located at a distance L from the plane of symmetry Q which is less than or equal to 25 mm.

The distance H from the touch button to the plane of the support element is less than or equal to 95 mm. (FIG. 2).

The touch button 32 is electrically connected via an electric cable 54 to a dead man's system processing device 56.

The lever arm 20 and the handle 24 are hollow in order to provide a passage for the electric cable 54 which is connected to the touch button 32, the passage being inaccessible from the outer side when the control is mounted on the support element.

The control 2 can be disassembled from the support element 4.

A dead man's system 60 according to the invention includes the driving control 2 described above and the VACMA processing device 56.

In this manner, access to the sensitive elements of the dead man's system when it is installed, that is to say, the touch button 32, the electric cable 54 and the processing device 56 is protected and any attempt to inhibit the dead man's system 60 is thus prevented.

In a variant, the touch button 32 is coupled to a radiofrequency transmitter and the processing device 56 includes a radiofrequency receiver which is capable of receiving signals transmitted by the radiofrequency transmitter.

The touch button 32 forms a capacitor whose fixed tactile surface 52 includes a plate face, the capacitor having a capacitance which is variable depending on whether or not the skin of a finger is in contact with the tactile surface 52 of the button 32.

The contact is provided as soon as a finger touches or as soon as a finger presses on the button 32 with a very weak pressure without deforming it.

The capacitance variation is measured in conventional manner by applying, through the cable 54 and to the terminals of the capacitor, a variable voltage which is provided by an alternating voltage source which is integrated in the processing device and by measuring the current flowing in the impedance mounted in series presented by the capacitor.

The processing device 56 includes an electromechanical relay or an electronic element, for example, a transistor, which is capable of detecting the passage of current when the touch button 32 is pressed.

In a variant, the processing device 56 includes an electromechanical relay or an electronic element, for example, a transistor which is capable of detecting an interruption of current when the touch button is pressed.

The processing device 56 is capable of monitoring that the driver complies with the VACMA cycle and verifying that the touch button is regularly kept in contact with at least one of his fingers for a duration of between 15 and 60 seconds, followed by a release for a duration typically of from 2 to 5 seconds. In this manner, it is verified that the driver has not fallen asleep or died and it is possible to actuate an emergency stop of the vehicle in the event of a lack of vigilance.

Figure 4:
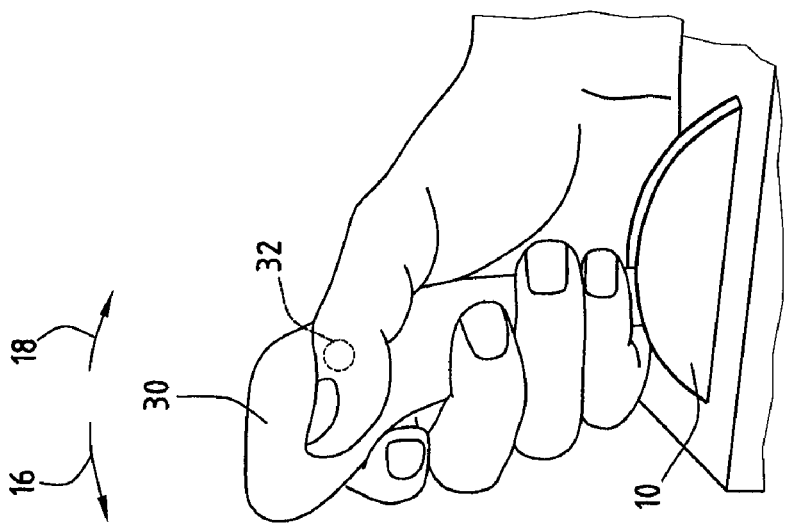
FIG. 4 is a view of the positioning of a hand of a driver in the seated position, gripping the control during an actuation maneuver or in the absence of a maneuver.

FIG. 4 illustrates a driving maneuver in which the control 2 is moved forwards and during which the driver is in a seated position and actuates the control with his right hand.

In this configuration, the hand pushes the handle with the base of the thumb while the phalanxes of the middle finger, the third finger and the little finger grasp the base of the handle.

The actuation of the VACMA touch button 32 is implemented naturally by the terminal phalanx of the thumb which presses on the button with minimal force. In the same manner, the button is released with minimal force.

The joint exercise of the forward driving maneuver and the actuation of the dead man's system is also carried out without any additional force since no torsion of the wrist is required, the plane defined by the handle being aligned with the travel plane P of the control.

This configuration is also ergonomic and can be used in the case of a backward. maneuver.

The hand is positioned in the same manner relative to the handle, only the portion applying the actuation force differing in that the rear phalanxes of the middle finger, third finger and little finger apply a force for pushing the handle backwards.

This configuration is also ergonomic and can be used if the control is not maneuvered into the neutral position N.

Figure 5:
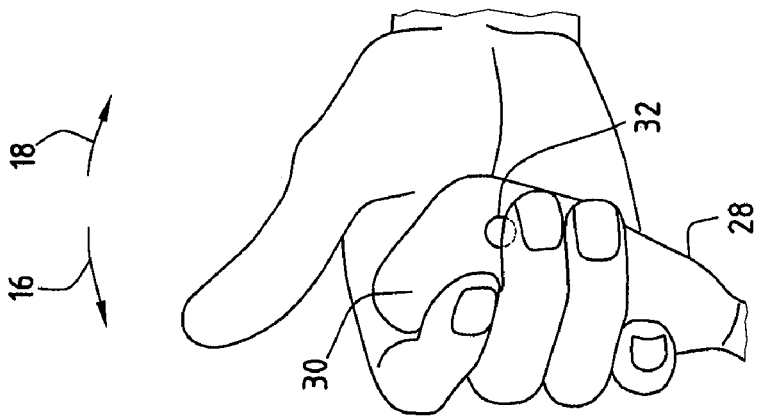
FIG. 5 is a view of the positioning of a hand of a driver in the standing position, gripping the control during a backward actuation maneuver.

FIG. 5 illustrates a driving maneuver in which the control 2 is moved backwards and during which the driver is in the standing position and actuates the control with his right hand.

In this configuration, the hand pushes the handle backwards with the phalanxes of the index finger, the rear phalanxes of the middle finger and the third finger, while the thumb is removed backwards from the head of the handle in an upward direction. The phalanxes of the index finger, the third finger and the little finger grasp the base of the handle.

The actuation of the VACMA touch button 32 is implemented naturally by the terminal phalanx of the middle finger which presses on the button with minimal force. In the same manner the button is released with minimal muscular force of the middle finger.

The joint exercise of the backward driving maneuver and the actuation of the dead man's system is also carried out without any additional force since no torsion of the wrist is required, the plane defined by the handle being aligned with the travel plane P of the control.

Figure 6:
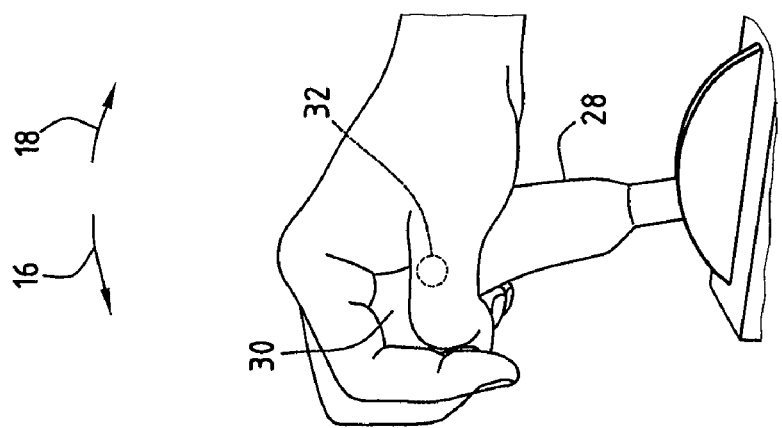
FIG. 6 is a view of the positioning of a hand of a driver in the standing position, gripping the control during a forward actuation maneuver or in the absence of a maneuver.

FIG. 6 illustrates a driving maneuver in which the control 2 is moved forwards 16 and during which the driver is in the standing position and actuates the control with his right hand.

In this configuration, the hand pushes the handle 24 with the base of the thumb and the cushions of the fingers, all of the phalanxes of the fingers, with the exception of the thumb, covering the head 30 of the handle 24 at the upper face 40, the phalanxes of the thumb grasping the base 28 of the handle 24.

The actuation of the VACMA touch button is carried out naturally by the rear phalanx of the thumb which presses on the touch button 32 with minimal force. In the same manner, the button 32 is released with minimal muscular force.

The joint exercise of the backward driving maneuver and the actuation of the dead man's system is also carried out without any additional force since no torsion of the wrist is required, the plane defined by the handle being aligned with the plane of the upper face and being slightly broken, which corresponds to a rest position of the wrist.

This configuration is also ergonomic and can be used if the control is not maneuvered into the neutral position N.

In accordance with the FIGS.1 to 6, the touch button 32 is arranged on the head 30 having an ovoid shape in the region of one of the two lateral faces, in this instance the lateral face 46 which is parallel with the actuation plane P containing the actuation directions 16, 18 and the major axis of the head 30, illustrated with broken lines in FIG. 2.

The axis which extends through the touch button 32 perpendicularly relative to the lateral face 46 in the region of which it is arranged intersects with the actuation plane P at a point which is close to or belongs to the major axis of the head 30 having an ovoid shape.

In this manner, during a transition of the hand between the driving mode described in accordance with FIG. 6, in which the palm of the hand is placed on the upper face 40, and the driving mode described in accordance with FIG. 4, in which the palm pushes or the phalanxes pull the control, the thumb of the hand remains ergonomically in contact with the touch button 32 without it being removed therefrom during the transition. The torsion movement of the handle required during this transition is a minimal movement in terms of travel and effort.

What is claimed is:

1. A vehicle driving control comprising a dead man's system processing device and a lever arm capable of moving in a predetermined actuation direction with, arranged at one end of the arm, a handle comprising:
    a generally tubular base extending along an axis of the lever arm;
    an ovoid shaped head fitted onto the base, the ovoid shaped head having a major axis inclined relative to the base;
    an upper face located on the ovoid shaped head and opposite the lever arm relative to the handle;
    at least one lateral face generally perpendicular relative to the upper face; and
    a touch button electrically connected to the dead man's system processing device, the touch button being located in the region of the at least one lateral face which is parallel with the actuation plane which includes the actuation direction and the major axis, the touch button being located on the ovoid shaped head.

2. The vehicle driving control according to claim 1, wherein an axis passing through the touch button and perpendicular to the lateral face at which the touch button is located, intersects the actuation plane at a point close to or belonging to the major axis of the ovoid shaped head which includes the actuation direction.

3. The vehicle driving control according to claim 1, wherein the handle is symmetrical relative to a plane of symmetry which contains the actuation direction and the distance from the touch button to the plane of symmetry is 25 mm or less.

4. The vehicle driving control according to claim 1 further comprising a support element relative to which the handle can be moved, the handle having a reference position in which the lever arm is arranged so as to be normal relative to the plane of the support element, and, in the reference position, the distance from the touch button to the support element being less than or equal to 95 mm.

5. The vehicle driving control according to claim 4, wherein an angle α formed by an extension plane of the support element and the major axis of the head is between 5 degrees and 85 degrees.

6. The vehicle driving control according to claim 1, wherein the touch button is touch-sensitive.

7. The vehicle driving control according to claim 1, wherein the handle is hollow and the touch button is capable of being electrically connected to the inner side of the handle by means of an electric cable.

8. The vehicle driving control according to claim 1, wherein the lever arm is hollow in order to provide a passage for an electric cable which is connected to the touch button, the passage being inaccessible from the outer side.

9. The vehicle driving control according to claim 1, wherein the dead man's system processing device includes an electromechanical relay or an electronic element which is capable of detecting a passage of current when the touch button is pressed.

10. The vehicle driving control according to claim 1, wherein the dead man's system processing device includes an electromechanical relay or an electronic element which is capable of detecting an interruption of current when the touch button is pressed.

* * * * *